(12) United States Patent
Richards et al.

(10) Patent No.: US 7,740,965 B2
(45) Date of Patent: Jun. 22, 2010

(54) BATTERY

(75) Inventors: Thomas Richards, Bolton, MA (US); Andrew G. Gilicinski, Westborough, MA (US); Robert Pavlinsky, Oxford, CT (US)

(73) Assignee: The Gillette Company, Boston, MA (US)

( * ) Notice: Subject to any disclaimer, the term of this patent is extended or adjusted under 35 U.S.C. 154(b) by 790 days.

(21) Appl. No.: 10/633,339

(22) Filed: Aug. 1, 2003

(65) Prior Publication Data

US 2005/0058887 A1  Mar. 17, 2005

(51) Int. Cl.
*H01M 6/02* (2006.01)
*H01M 6/30* (2006.01)
*H01M 6/38* (2006.01)

(52) U.S. Cl. .............................. 429/27; 429/72; 429/82

(58) Field of Classification Search .................. 429/26, 429/27, 34, 38, 82–89; 251/129; 137/625.33
See application file for complete search history.

(56) References Cited

U.S. PATENT DOCUMENTS

| | | | |
|---|---|---|---|
| 4,055,955 A | 11/1977 | Johnson | |
| 4,281,513 A | 8/1981 | Johnson et al. | |
| 4,435,229 A | 3/1984 | Johnson | |
| 4,490,976 A | 1/1985 | Johnson | |
| 4,965,545 A | 10/1990 | Johnson | |
| 5,061,914 A | 10/1991 | Busch et al. | |
| 5,119,555 A | 6/1992 | Johnson | |
| 5,165,897 A | 11/1992 | Johnson | |
| 5,245,738 A | 9/1993 | Johnson | |
| 5,325,880 A | 7/1994 | Johnson et al. | |
| 5,588,295 A * | 12/1996 | Brotz | 60/528 |
| 5,619,177 A | 4/1997 | Johnson et al. | |
| 5,771,742 A | 6/1998 | Bokaie et al. | |
| 5,903,099 A | 5/1999 | Johnson et al. | |
| 5,960,812 A | 10/1999 | Johnson | |
| 6,350,537 B1 * | 2/2002 | Pedicni | 429/27 |
| 6,470,108 B1 | 10/2002 | Johnson | |
| 6,955,187 B1 * | 10/2005 | Johnson | 137/625.33 |
| 2005/0058887 A1 * | 3/2005 | Richards et al. | 429/82 |

* cited by examiner

*Primary Examiner*—Patrick Ryan
*Assistant Examiner*—Alix Echelmeyer
(74) *Attorney, Agent, or Firm*—Fish & Richardson P.C.

(57) ABSTRACT

A battery includes a battery can housing an cell that supplies electrical energy at terminals of the cell by an electro-chemical reaction with oxygen, the can including, a first member having at least one hole that is exposed to air; and a second member. The battery also includes a mechanism coupled to one of the first and second members to move the one of the first and second members such that when current is drawn from the battery, the opening in the member allows air to pass into the battery, and to move the one of the first and second members such that when current is not drawn from the battery, the opening in the member is not in registration to inhibit air to pass into the battery. The battery also includes a circuit to control the mechanism. In one embodiment the circuit monitors levels of $O_2$ in a air plenum that surrounds the cell. The circuit to monitor levels of $O_2$ in the air plenum includes a florescent detector/sensor that senses and responds to changes in $O_2$ in the plenum by using the "quenching effect" of oxygen on a fluorescent material.

38 Claims, 7 Drawing Sheets

On

Off

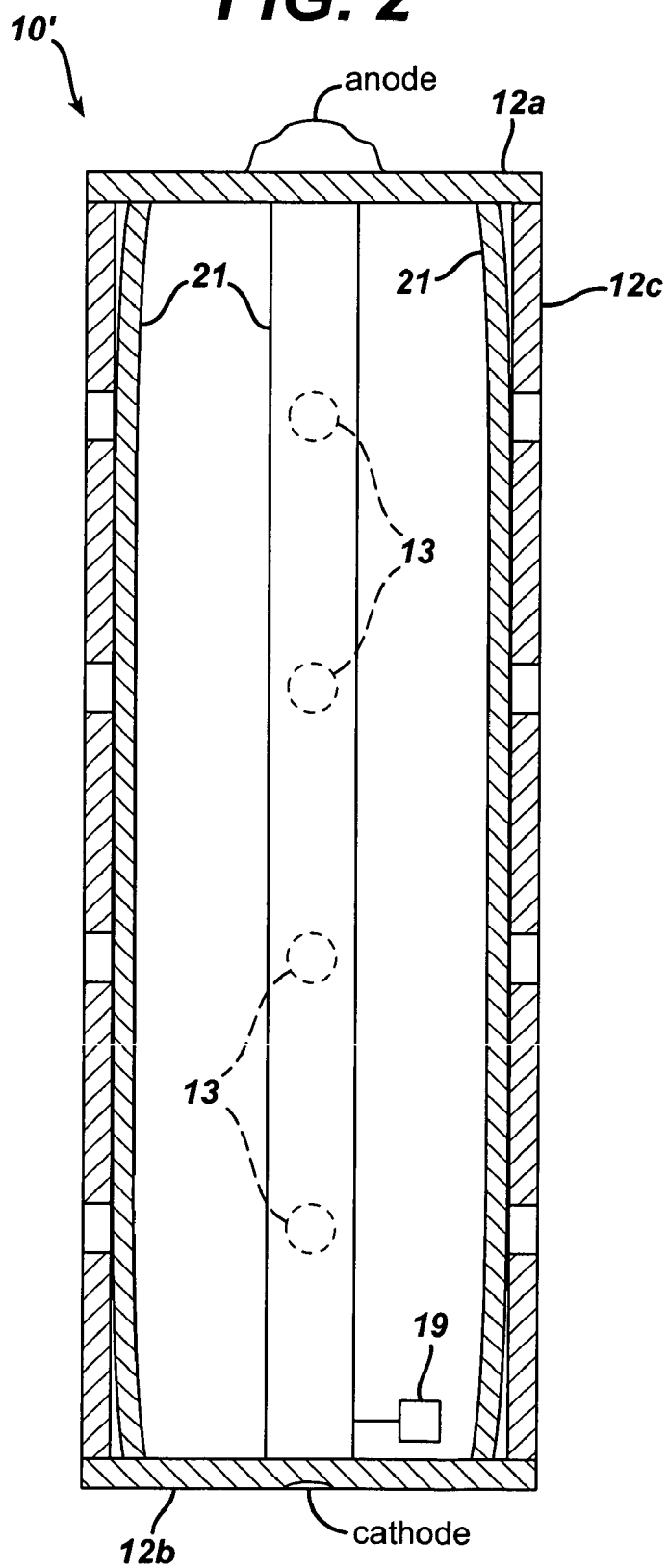

Off

On

BATTERY

BACKGROUND

The invention relates to valves for fuel-air and metal-air batteries.

Batteries are commonly used as sources of electrical energy. A battery contains a negative electrode, "anode", and a positive electrode, "cathode." The anode has an active material that can be oxidized; the cathode has or consumes an active material that can be reduced. The anode active material is capable of reducing the cathode active material. In order to prevent direct reaction of the anode material and the cathode material, the anode and the cathode are electrically isolated from each other by a separator. An electrolyte in contact with the anode and the cathode contains ions that flow through the separator between the electrodes to maintain charge balance throughout the battery during discharge.

In a metal-air electrochemical cell, oxygen is reduced at the cathode, and a metal, such as zinc, is oxidized at the anode. Oxygen is supplied to the cathode from atmospheric air external to the cell through one or more air opening(s), such as circular holes in a can that surrounds cell. In zinc-air cells, the overall electrochemical reaction within the cell results in zinc metal being oxidized to zinc ions and $O_2$ from air being reduced to hydroxyl ions ($OH^-$). Ultimately, zincate or zinc oxide is formed in the anode. While these chemical reactions are taking place, electrons are transferred from the anode to the cathode, providing power to the device. With certain types of zinc-air batteries a temporary cover is placed over the openings in the battery and once the battery is brought into service, the cover is removed allowing air to enter the battery and oxidize the zinc. This configuration is often used with zinc-air batteries that are used to power hearing-aids, since they are in general continuous use and are replaced often.

During use, it is desirable to provide uniform discharge of the active materials and a relatively high discharge voltage profile. It is also desirable for the cell to have a long service life.

SUMMARY

One cause of limited service life of such metal-air cells results from exposure of the cell to the atmosphere after the battery is removed from a package and air holes are opened allowing air to enter the package. Since air holes are continuously open, water can evaporate from the cell (leading to "dry-out" of the cell) or condensation can form in the cell (leading to "flooding of the cell"). In addition, electrolyte can react with carbon dioxide in the atmosphere and lead to premature cell failure. A mechanism that completely or substantially completely closes the air openings while the cell is not discharging could substantially extend the useful service life of the cell.

According to an aspect of the invention, a battery includes a battery can housing an cell that supplies electrical energy at terminals of the cell by an electro-chemical reaction with oxygen, the can including, a first member having at least one hole that is exposed to air; and a second member. The battery also includes a mechanism coupled to one of the first and second members to move the one of the first and second members such that when current is drawn from the battery, the opening in the member allows air to pass into the battery, and to move the one of the first and second members such that when current is not drawn from the battery, the opening in the member is not in registration to inhibit air to pass into the battery.

According to an additional aspect of the invention, an air valve for a battery includes a first member having at least one hole that is exposed to air, a second member having at least one hole and a mechanism coupled to one of the first and second members in order to move the one of the first and second members such that when current is consumed from the battery, the opening in the member is in registration with the opening in the second member to allow air to pass through the valve, and to move the one of the first and second members such that when current is not drawn from the battery, the opening in the member is not in registration with the opening in the second member to prevent air to pass through the valve.

According to an additional aspect of the invention, an air valve for a battery includes a first cylindrical member having at least one hole in sidewalls of the member, the hole exposed to air, a ribbon of a shape memory alloy material, the ribbon disposed over the at least one hole in the first cylinder and a circuit coupled to ribbon in order to move the ribbon such that when current is consumed from the battery, the opening in the cylindrical member is uncovered by the ribbon to allow air to pass through the valve, and to move the ribbon such that when current is not drawn from the battery, the opening in the cylindrical member is covered by the ribbon to inhibit air from passing through the valve.

According to an additional aspect of the invention, a battery includes a cell, an air valve to control the level of air in the cell, an air plenum surrounding the cell and a circuit to monitor levels of oxygen ($O_2$) in the air plenum.

According to an aspect of the invention, a circuit to monitor levels of $O_2$ in an air plenum, the circuit including a fluorescent detector/sensor that senses and responds to changes in $O_2$ in the plenum by using the "quenching effect" of oxygen on a fluorescent material.

According to an aspect of the invention, a method of operating a battery includes controlling a quantity of air that enters an metal-air battery by moving a first cylindrical member having at least one hole that is exposed to air relative to a second member having a least one hole such that when current is consumed from the battery, the holes in the cylindrical members are in registration allowing air to pass into the battery and when current is not drawn from the battery, the holes are not in registration thus inhibiting air to pass into the battery.

According to an aspect of the invention, a method of operating a battery includes controlling a quantity of air that enters an metal-air battery by monitoring levels of $O_2$ in the battery by sensing and responding to changes in $O_2$ in battery and moving a first cylindrical member having at least one hole that is exposed to air relative to a second member having a least one hole according to monitored levels of $O_2$ in the battery.

Embodiments of the invention may include one or more of the following features. The battery can be a metal-air battery, a button cell, a cylindrical battery, or a prismatic battery. The battery has the first and second members as coaxially disposed cylinders each having the at least one opening that are placed in and out of registration to allow or inhibit air from passing into the battery. The first and second members have a plurality of openings, in some embodiments arranged in a column or series of columns along the length of the cylinders. The mechanism is an actuator comprised of a shape memory alloy material, especially a high force, low displacement shape memory alloy (SMA). The actuator is coupled to a circuit that draws power during a change of state allowing the circuit to minimize drain on the battery. The actuator is a wire or a ribbon. The first member can be a cylinder and the second member can be a ribbon of a shape memory alloy material, the ribbon disposed over the at least one hole in the first cylinder.

Other features, objects, and advantages of the invention will be apparent from the description and drawings, and from the claims.

DESCRIPTION OF THE DRAWINGS

FIG. 2 is a cross-sectional view of an embodiment of a metal-air battery having an alternate air valve.

DETAILED DESCRIPTION

Figure 1:
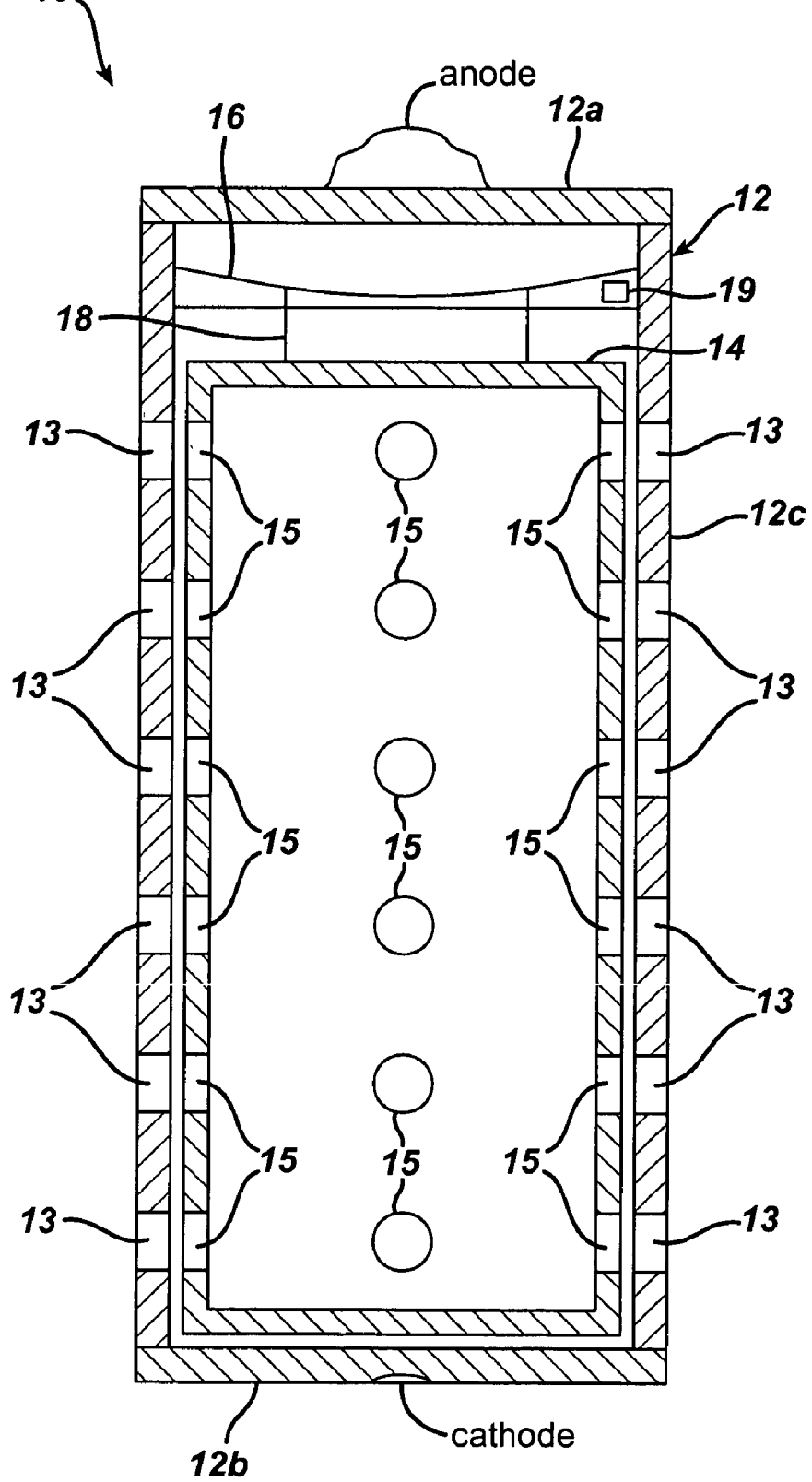
FIG. 1 is a cross-sectional view of an embodiment of a metal-air battery having an air valve.

Referring to FIG. 1, a battery 10 includes a housing 12. The housing 12 includes an upper member 12a that supports an anode contact and a lower member 12b that supports a cathode contact. Disposed between the upper and lower members 12a, 12b is a first cylindrical member 12c that together with the upper and lower members forms the housing 12 or "battery can" for the battery 10. The cylindrical member 12c has at least one hole, here shown having a plurality of evenly-spaced holes generally 13 arranged in a series of columns along the length of the cylindrical member 12c. In a typical configuration, each hole is 0.5-1.0 mm in diameter although other diameters could be used and the holes need not be round. In an exemplary embodiment, 48 holes are provided for an "AA" can, the holes are arranged in 8 columns of 6 holes each, though a broad range of other sizes, numbers and configurations of holes could be used. The cylindrical member 12c is exposed to air and can in general carry a label or other identification markings and thus provides the outer case of the battery 10.

The battery 10 includes a second member, e.g., a second cylindrical member 14 coaxially disposed within the first cylindrical member 12c. The second cylindrical member 14 has at least one hole, here shown having a plurality of evenly-spaced holes generally 15 arranged in a series of columns along the length of the cylindrical member 14. As shown, the holes 15 in the second cylindrical member have a corresponding relation to the holes 13 in the first cylindrical member 12c. The plurality of holes 13, 15 in the first and second cylindrical members 12c and 14 respectively are further arranged such that when one of the first and second cylindrical members is moved relative to the other, the at least one hole, or the plurality of holes arranged in a series of columns along the length of the cylindrical member 12c and cylindrical member 14 are in registration or alignment producing through apertures generally 17 in one position allowing air to enter the battery and are not in registration is a second position shutting out air from entering the battery 10, as shown respectively in FIGS. 1A and 1B The cathode (with attached separator on inside wall) is a cylinder about 1 mm thick located just inside the inner valve cylinder. The anode is tubular in shape and occupies the remaining space inside the cathode.]

Figure 1A:
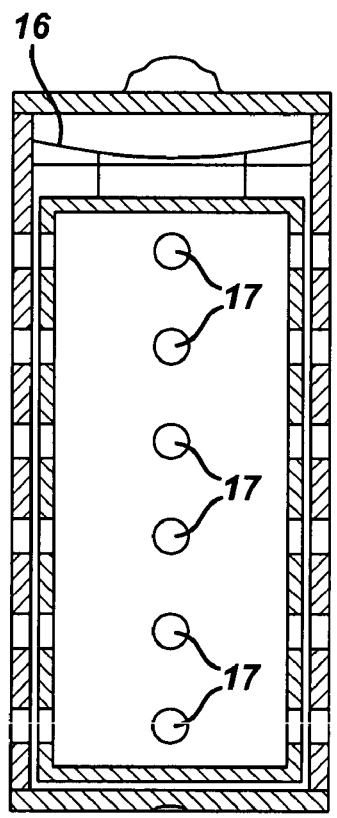
FIGS. 1A, 1B are cross-sectional views depicting different configurations of the air valve in opened and closed positions respectively.
Figure 1B:
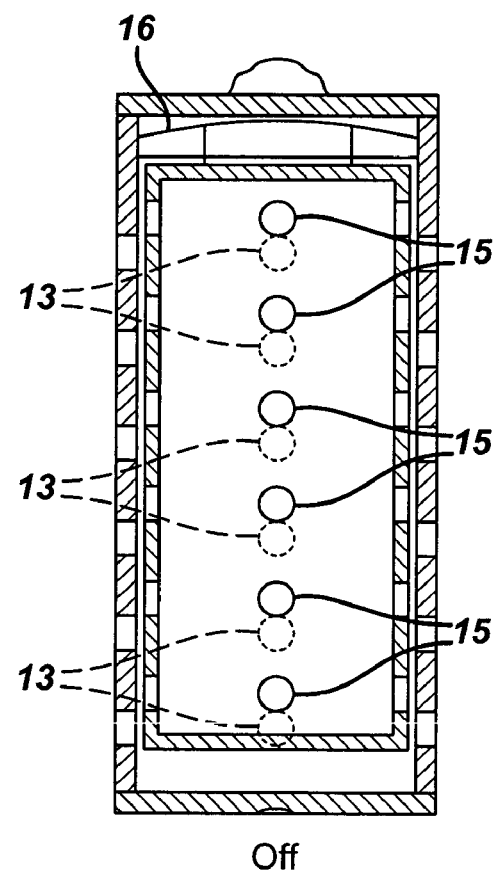

The battery 10 further includes an actuator 16 coupled to one of the first and second members, here the second cylinder 14 through an intermediate member 18. The actuator causes movement of the second cylinder 14 relative to the first cylinder 12c, thus moving the holes in and out of registration as shown in FIGS. 1A and 1B. The actuator 16 is configured with the battery such that when current is consumed from the battery the actuator causes the second cylinder to move relative to the first such that the openings in the first and second cylinders are in registration allowing air to pass into the battery. When current is not being drawn from the battery, the second cylinder moves relative to the first such that the openings in the first and second cylinders 12c and 14 are not in registration to inhibit or prevent air to pass into the battery. By allowing air to enter the battery only when current is being drawn from the battery allows for a longer operating life due to a reduced time of contact with the outside atmosphere and thus reduction in water exchange or carbon dioxide reaction with the electrolyte.

The actuator 16 provides a bi-stable latching mechanism for the moveable one of the cylinders here the second cylinder 14. The actuator 16 is comprised of a shape memory alloy material that deforms into a first position with application of a voltage potential (causing heating of the material of the actuator) and returns to a resting shape upon removal of the potential (caused by cooling of the actuator). The actuator 16 is comprised of a high force, low displacement shape memory alloy (SMA) and is controlled by a circuit 19 (FIGS. 3 and 4 or other suitable circuits) that only draws power during a change of state to minimize drain on the battery 10.

The actuator 16 shown in FIGS. 1, 1A and 1B is a wire coupled between inner sidewalls of the first cylinder 12c and an intermediate member 18 that transfers force produced by the wire to the second cylinder 14 causing movement of the second member 14.

An example of a shape memory alloy material, (SMA) material, is a TiNi, a nickel-titanium alloy. Other suitable shape memory alloy materials are possible. Shape memory alloy materials undergo a thermo-elastic phase transformation in passing from a martensitic phase when at a temperature below the material's phase change transition temperature to an austenitic phase in a memory shape when heated through the phase change transition temperature. That is, below the phase change transition temperature, the alloy is easily plastically deformed, and remains deformed until heated through the phase change transition temperature at which point it forcefully reverts to its original or memory shape. The TiNi material has resistivity characteristic. As current flows through the wire the wire is heated, which can be used to change the shape of the wire. Thus the memory shape is the shape of the alloy in its high temperature phase, and the deformed shape is the shape of the alloy in its low temperature phase.

The actuator 16 could also be a ribbon (not shown) coupled between the inner sidewalls of the first cylinder 12c and an intermediate member 18 that transfers a higher amount of force to the second cylinder 14. In addition, on the bottom of the battery can be a restoring spring (not shown) that provides a mechanical force that tends to restore the second cylinder 14 to its resting position to assist in closing the air valve.

Figure 2A:
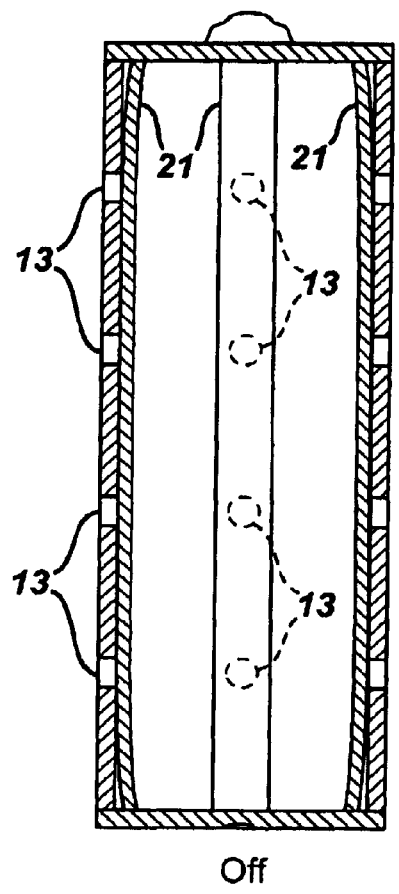
FIGS. 2A, 2B are cross-sectional views depicting different configurations of the air valve of FIG. 2 in opened and closed positions respectively.
Figure 2B:
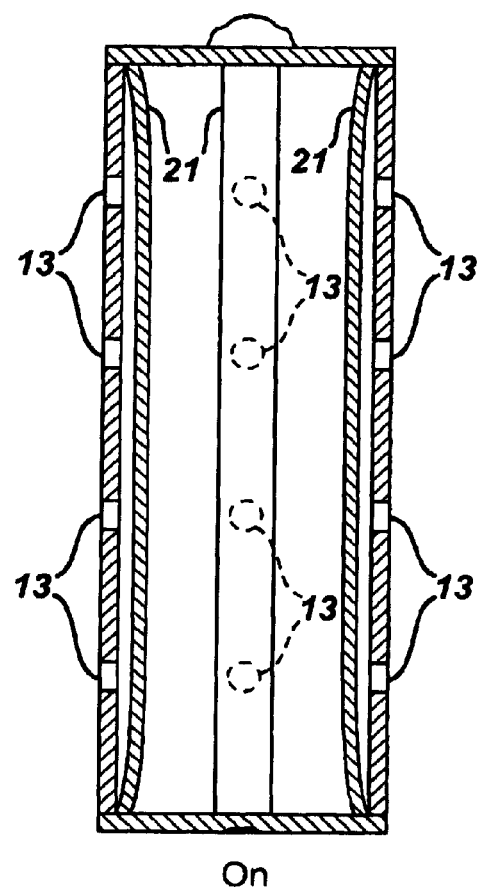

Referring to FIG. 2, an alternative arrangement 10' includes a housing 12 having an upper member 12a that supports anode contact and a lower member 12b that supports a cathode contact. Disposed between the upper and lower members 12a, 12b is a cylindrical member 12c that together with the upper and lower members forms the housing 12 or battery can for the battery 10'. The cylindrical member 12c has at least one hole, and preferably a plurality of holes 13 arranged in a series of columns along the length of the cylindrical member 12*c*. The cylindrical member 12*c* is exposed to air and can carry the label for the battery. The cylindrical member 12*c* supports a series of long strips or ribbons generally 21 of a SMA material 10' over the holes 13 in the cylindrical member 12*c* and arranged such that the ribbons 21 will be in a flat, i.e., closed position to cover the holes 13 in the cylinder 12*c* (FIG. 2A) shutting out air from entering the battery 10' when the battery 10' does not draw current, and will be in a non-planar, open position, as shown in FIG. 2B) allowing air to enter the battery 10' through the holes 13 when the ribbon 21 is heated by current passing through the battery 10' and causing the material to return to its memory shape. Although the ribbons 21 can be carried on the inside or the outside of the cylindrical member 12*c* it may be preferred to have the ribbons 21 carried on the inside of the cylindrical member 12*c*.

The battery 10' further includes a circuit 19 coupled to each of the ribbons 21 in order to supply current to change the shape of the ribbons 21 to open or close air passage through the holes 13 in the cylinder 12*c*. The circuit 19 (or circuits) only draws power during a change of state thus minimizing drain on the battery 10'. When current is consumed from the battery 10' the ribbons 21 move such that the openings in the cylinder are open allowing air to pass into the battery 10'. When current is not being drawn from the battery, the ribbons 21 move such that the holes 13 in the cylinder 12*c* are closed to inhibit air from passing into the battery 10'.

The ribbons 21 are comprised of the shape memory alloy materials such as the TiNi, (nickel-titanium alloy, as mentioned above). Other suitable shape memory alloy materials are possible. At a temperature below the material's phase change transition temperature (e.g., when a load is not being drawn from the battery) the ribbons return to a flat shape closing the holes 13, and when current is drawn from the battery 10', the ribbons 21 return to their memory shape, which can be a curve or other non-planar shape to allow air to enter the battery through the holes 13.

These approaches minimize air access when the metal/air battery, e.g., Zinc/air cell is not discharging. The arrangement slows or potentially inhibits air access during "off" states of the battery, in a very energy efficient manner and can be used for many physical configurations of such batteries. The arrangement provides an air access shutter and is especially suitable for cylindrical battery configurations such as standard "AA," AAA, C, D, etc. cells. The approach could be used for flat cells, such as prismatic cells, by using flat members with holes instead of cylindrical members.

This approach also has lower manufacturing costs and is more energy efficient than other air valve configurations. The arrangement provides a self-actuating air access shutter for a Zinc/air cell. Such an air valve system could also be used with a diffusion tube approach and permit the use of shorter diffusion tube lengths. The air valve could also be used to make alkaline fuel cells feasible since they will also require approaches for limiting electrolyte carbonation.

Figure 3:
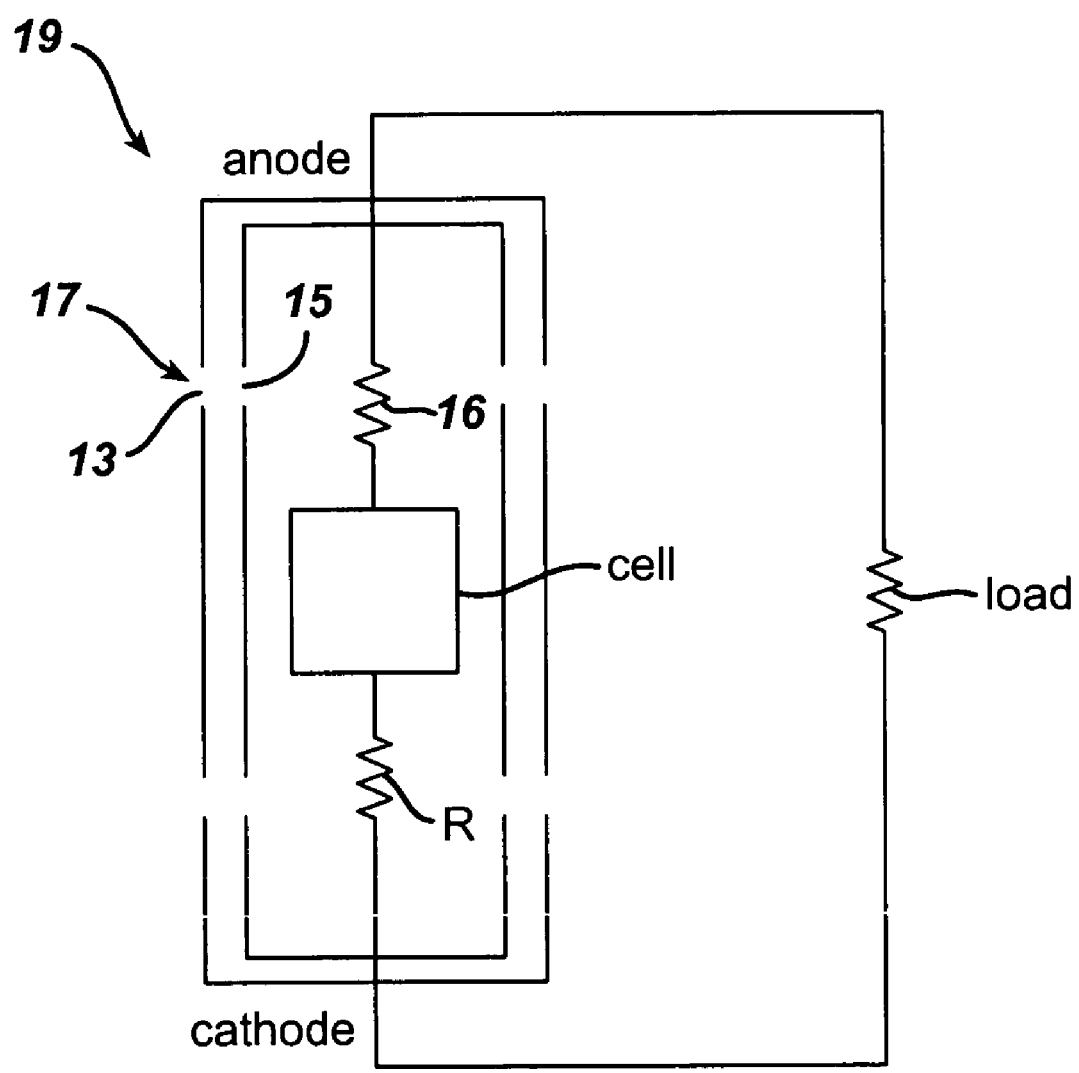
FIG. 3 is a schematic diagram of a circuit for controlling the air valves in FIG. 2 or 3.

Referring to FIG. 3, an embodiment of a circuit 19 to cause switching of positions (states) of the actuator 16 (wire or ribbon) is shown. The circuit 19 includes the wire or ribbon or plurality of ribbons (not shown) coupled in a series circuit with a resistance R (for short circuit protection, selected to be sufficiently high to provide short circuit protection and sufficiently low to allow a high enough level of current to be produced in the actuator 16) and the load. When a load is not present the circuit is broken and there would not be any current flow through the circuit. The wire (or ribbon(s)) would return to an "off state" causing the air valve to close; whereas, when a load is present current is drawn through the wire (or ribbon(s)) heating the wire to take on its memory state and thus opening the air valve.

The above technique for regulating air/O$_2$ ingress through the air valve in the metal-air cell during discharge is an open loop control approach, one where the maximum discharge is controlled solely by the size and location of the air access holes. A more sophisticated air management system can have control electronics that sense voltage or current supplied by the cell, which responds by modulating the air valve according to the air/O2 required for a particular discharge condition. A control algorithm can be defined according to the equivalent stoichiometric oxygen requirement. For example, a zinc-air cell reduces oxygen according to the following simplified reaction

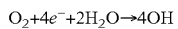

$$O_2 + 4e^- + 2H_2O \rightarrow 4OH$$

Using the Faraday constant (F) an amp-hour equivalent (Ah/eq) for each mole of oxygen reduced can be derived where Ah is an amp hour and n is number of moles of air and Ah/eq is the amp-hour equivalent for each mole of oxygen, as:

$$Ah = F \times n = 26.8 \text{ Ah/eq} \therefore 4 \text{ eq/molO}_2$$

with the molar volume of O$_2$ and the oxygen concentration the amp-hour equivalent can be converted to a theoretical volume of air. For a zinc-air cell, the amp-hour equivalent translates to an 18 cc/min stoichiometric volume of air for a single cell at a one-amp discharge.

This stoichiometric volume of air assumes the cell utilizes 100% of the oxygen, usually has an intrinsic error due to fluctuations in the discharge load and distribution of oxygen within the plenum. Usually a stoichiometric rate factor is applied to the calculated volume of air to ensure adequate air is available during discharge. Once the modified stoichiometric volume is derived, an algorithm can be developed to switch the air mover on or off based on the oxygen demand by the cell. Normally this type of system requires that an excess amount of air/O$_2$ be produced because the voltage/current relationship is a secondary effect to the reaction (i.e. open loop system). A system that senses oxygen may use an electrochemical cell or a catalytic sensor. Both techniques however have an inherent time delay between sensing and responding to a change in O$_2$ concentration.

Figure 4:
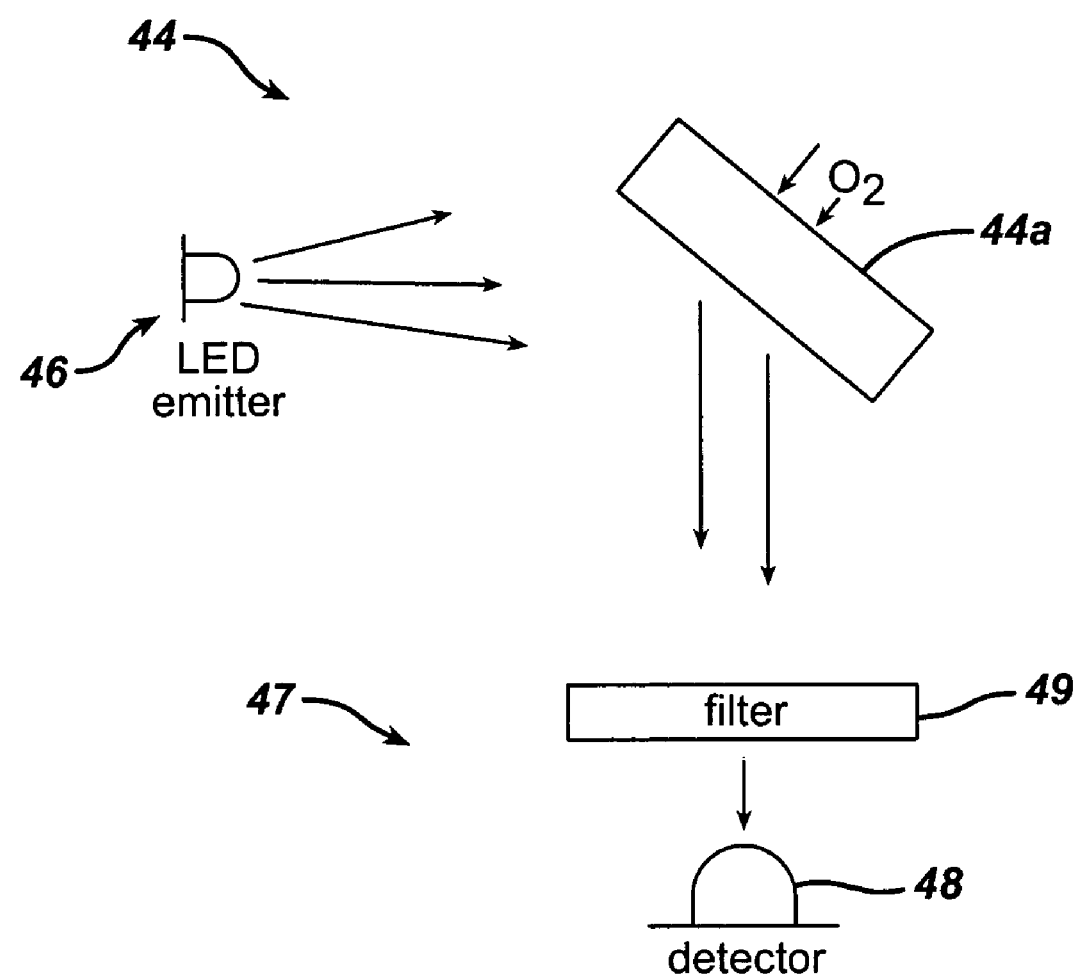
FIG. 4 is a schematic diagram of a detector.

Referring to FIG. 4, a florescent detector/sensor 44 senses and responds to a change in O$_2$ by using the so-called "quenching effect" of oxygen on a fluorescent material. Fluorescent materials absorb light in a certain wavelength range and emit light over a different range of wavelengths. The fluorescent sensor 44 to detect O$_2$ includes a permeable polymer matrix 44*a*, e.g., (PTFE) Teflon, silicon rubber and so forth that is doped with molecules (not shown) that exhibit fluorescence. These can be metalloporphyrins that exhibit fluorescence, e.g., ruthenium or platinum porphyrin complexes. The matrix 44*a* is used in conjunction with a LED emitter (e.g., 450 nm) 46 to illuminate the sensor material 44*a* in the excitation spectrum and a photodiode receiver 47 including a red filter 48 interposed in an optical path between the matrix and an LED photodiode detector 49 to detect a phase shift in light spectrum. Normally the excitation light source is modulated sinusoidally in intensity through the sensor material 44*a*. The resultant light emission from the sensor material 44*a* will be shifted in phase. By measuring the amount of phase shift, one can determine the O$_2$ concentration surrounding the sensor by its Stern-Volmer response.

Figure 5:
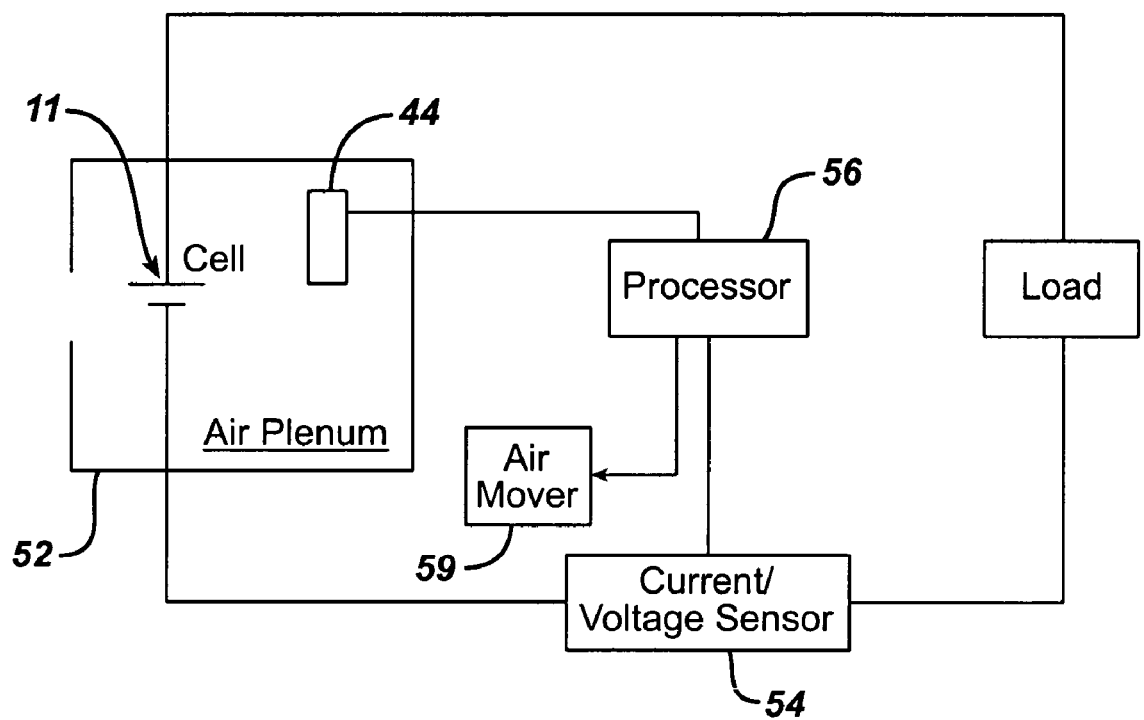
FIG. 5 is a schematic diagram of an alternate circuit for controlling the air valve in FIG. 2 or 3.

Referring to FIG. 5, a circuit 51 to control the reaction by monitoring air within an metal-air or fuel cell 11 uses closed loop control. The circuit 51 includes an air plenum 52 that surrounds the fuel cell (metal-air cell) 11 and a fluorescence detector/sensor 44 (FIG. 4) disposed in the air plenum 52 where the level of air/$O_2$ consumed directly by the cell 11 is monitored and can be responded to. This type of oxygen sensing is disposed in a metal air/fuel cell closed loop control system that also includes a current sensor 54 coupled between the fuel cell 11 and the device load. A signal processor 56 is coupled to the monitor/detector 56 and executes an empirically determined algorithm. The processor 56 in response to the level of oxygen in the cell and the current being drawn from the cell 11 produces a signal (via an interface not shown) that operates an air mover 59, which regulates the flow of air into the cell 11. In the embodiment above, the air mover 59 is the combination of the actuator and the cylinders 12c and 14. By employing the polymer sensor within the air plenum, air consumption or direct consumption of oxygen can be monitored. The air supply system or air management system can be switched on/off or modulated to supply the precise quantity of air dependant on the level of reaction of the cell. The circuit 51 can also be used with diffusion tube air valve types to allow for shorter length diffusion tubes.

The sensor can be an integral with the light source and detector (i.e. fiber optic or IC) as in FIG. 5 or the components can be separate (emitter, sensor/detector) as in FIG. 6.

An algorithm can be developed and executed within the signal processor to operate the air mover in direct relationship to the oxygen consumed by the metal air/or fuel cell. Current/voltage sensing is used to activate the signal processor and/or monitor output levels. The fluorescent $O_2$ sensor can be comprised of Pt (TfPP) (platinum tetraphenylporphryrin), Pt OEP (platinium octaethylporphryrin), or $Ru(BaThO)_3$ (ruthenium complexes) immobilized in an oxygen permeable matrix.

Other embodiments are within the scope of the claims. For instance, the self-actuating air valve arrangement can be used with fuel cells, especially for portable device applications eliminating various poisons for catalysts that could be present. Also with so-called direct fuel cells that use methanol, there is a phenomena called methanol crossover in which methanol in the anode chamber of the fuel cell can crossover to the cathode when the anode catalyst is electrically disconnected from a load and evaporate. The methanol can react producing by-products that are emitted from the cell. However, with the self-actuating air shutter structure on a cathode air inlet, the structure shuts the cathode closed when the fuel cell is not running, thus containing any excess methanol.

What is claimed is:

1. A battery comprises:
  A battery can housing a cell that supplies electrical energy at terminals of the cell by an electro-chemical reaction with oxygen, the can including:
    a first member having at least one hole that is exposed to air: and
    a second member; and
  a mechanism, to move a first one of the first and second members, the mechanism comprising:
    a member whose shape deforms in response to a current passing through the member when current is drawn from the battery, the member being coupled to the first one of the first and second members to move the first one of the first and second members such that when current is drawn from the battery, the member has a first shape that allows air to pass through the opening in the first member into the battery and the member has a second shape that causes the one of the first and second members to move and inhibit air from passing through the opening and into the battery.

2. The battery of claim 1 wherein the first and second members are coaxially disposed cylinders each having at least one opening that are placed in and out of registration to allow or inhibit air from passing into the battery.

3. The battery of claim 1 wherein the first and second members are coaxially disposed cylinders each having a plurality of openings.

4. The battery of claim 1 wherein the first and second members are coaxially disposed cylinders each having a plurality of openings arranged in a column along the length of the cylinders.

5. The battery of claim 1 wherein the first and second members are cylindrical members and the member is coupled to the second cylindrical member that is coaxially disposed within the first cylindrical member.

6. The battery of claim 1 wherein the member is an actuator comprised of a shape memory alloy material.

7. The battery of claim 6 wherein the actuator is a wire with the wire changing between a convex shape and a concave shape to change the position of the second cylinder.

8. The battery of claim 7 further comprising a member coupled between an upper end portion of the second member and the wire to transfer a force generated by the wire to the second member.

9. The battery of claim 6 wherein the actuator is a ribbon with the ribbon changing between a convex shape and a concave shape to change the position of the second cylinder.

10. The battery of claim 9 further comprising a member coupled between an upper end portion of the second member and the ribbon to transfer a force generated by the ribbon to the second member.

11. The battery of claim 6 wherein the actuator is a ribbon, wherein the first and second members are coaxially disposed cylinders each having a plurality of openings arranged in a column along the length of the cylinders.

12. The battery of claim 6 wherein the first and second members are coaxially disposed cylinders each having a plurality of openings arranged in a column along the length of the cylinders.

13. The battery of claim 1 wherein the member is an actuator comprised of a high force, low displacement shape memory alloy (SMA).

14. The battery of claim 13 wherein the actuator is coupled to a circuit, and the circuit only draws power during a change of state allowing the circuit to minimize drain on the battery.

15. The battery of claim 1 wherein the first member is a cylinder and the second member is a ribbon of a shape memory alloy material, the ribbon disposed over the at least one hole in the first cylinder.

16. A method of operating a battery, the method comprises:
  controlling a quantity of air that enters a metal-air battery by:
    passing current through a member coupled to a first cylindrical member and a second cylindrical member, to move one of the first cylindrical member and the second cylindrical member from a first position to a second position, the first cylindrical member having at least one hole that is exposed to air, with the second position providing the at least one hole in the first cylindrical member in registration with at least a second hole in the second cylindrical member and when current is not drawn from the battery the member causing the one of the first cylindrical member and the second cylindrical member to return to the first position such that the holes are not in registration inhibiting air to pass into the battery.

17. The method of claim 16 wherein the hole in the first and second cylindrical members is a first hole and each of the first and second cylindrical members have a plurality of holes including the first hole.

18. The method of claim 17 wherein the first and second cylindrical members are coaxially disposed and the holes in each of the cylindrical members are arranged in a column along the length of the cylindrical members.

19. The method of claim 16 wherein moving comprises:
passing a current through a member comprised of a shape memory alloy material to change the shape of the member and effect movement of the first cylindrical member.

20. The method of claim 19 wherein the member is an actuator comprised of a high force, low displacement shape memory alloy (SMA).

21. A battery comprises:
a battery can housing a cell that supplies electrical energy at terminals of the cell by an electro-chemical reaction with oxygen, the can including:
a first cylindrical member having at least one hole;
a second cylindrical member having at least one hole; and
a member coupled to one of the first and second cylindrical members to move one of the first and second cylindrical members such that when current is drawn from the battery, the holes in the first and second cylindrical members are in registration to allow air to pass into the battery and to move the one of the first and second cylindrical members such that when current is not drawn from the battery, the holes in the first and second cylindrical members are not in registration to inhibit air to pass into the battery.

22. The battery of claim 21 wherein the first and second cylindrical members are coaxially disposed each having at least one opening that are placed in and out of registration to allow or inhibit air from passing into the battery.

23. The battery of claim 21 wherein the first and second cylindrical members are coaxially disposed each having a plurality of openings that are placed in and out of registration to allow or inhibit air from passing into the battery through the plurality of openings.

24. The battery of claim 21 wherein the first and second cylindrical members are coaxially disposed and each has a plurality of openings arranged in a column along the length of the cylindrical members.

25. The battery of claim 21 wherein the first and second cylindrical members are coaxially disposed and the member is coupled to the second cylindrical member that is coaxially disposed within the first cylindrical member.

26. The battery of claim 21 wherein the member is an actuator comprised of a shape memory alloy material.

27. The battery of claim 26 wherein the actuator is a wire.

28. The battery of claim 27 further comprising a member coupled between an upper end portion of the second member and the wire to transfer a force generated by the wire to the second member.

29. The battery of claim 26 wherein the actuator is a ribbon.

30. The battery of claim 29 further comprising a member coupled between an upper end portion of the second member and the wire to transfer a force generated by the wire to the second member.

31. The battery of claim 21 wherein the member is an actuator comprised of a high force, low displacement shape memory alloy (SMA).

32. The battery of claim 31 wherein the actuator is coupled to a circuit that draws power during a change of state allowing the circuit to minimize drain on the battery.

33. A method of operating a battery, the method comprises:
controlling a quantity of air that enters a metal-air battery by:
passing current through a member to move a first member mechanically coupled to the member relative to a second member having a least one hole that is exposed to air, such that when current is consumed from the battery, the hole in the second member is opened to permit air to flow through the hole into the battery and when current is not flowing through the member, the member causes the first member to move inhibiting air from flowing through the hole into the battery.

34. The method of claim 33 wherein first and second members are cylindrical members.

35. The method of claim 33 wherein first member is a ribbon and the second member is cylindrical member.

36. The method of claim 33 wherein moving comprises:
passing a current through an actuator comprised of a shape memory alloy material to change the shape of the member and effect movement of the first member.

37. The method of claim 33 wherein the first member is the actuator and is comprised of a high force, low displacement shape memory alloy (SMA).

38. The method of claim 33 wherein the actuator is attached to the first member is and is comprised of a high force, low displacement shape memory alloy (SMA).

* * * * *

UNITED STATES PATENT AND TRADEMARK OFFICE
CERTIFICATE OF CORRECTION

PATENT NO. : 7,740,965 B2  Page 1 of 1
APPLICATION NO. : 10/633339
DATED : June 22, 2010
INVENTOR(S) : Thomas C. Richards et al.

It is certified that error appears in the above-identified patent and that said Letters Patent is hereby corrected as shown below:

On the title page item (75), should read:

--Thomas Richards, Bolton, MA (US); Andrew G. Gilicinski, Westborough, MA (US); Gordon G. Guay, Chelmsford, MA (US); Robert Pavlinsky, Oxford, CT (US)--

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,740,965 B2 | Page 1 of 1 |
| APPLICATION NO. | : 10/633339 | |
| DATED | : June 22, 2010 | |
| INVENTOR(S) | : Thomas C. Richards et al. | |

It is certified that error appears in the above-identified patent and that said Letters Patent is hereby corrected as shown below:

On the Title page

Item (75), delete "Westborough, MA" and insert -- Danville, CA --, therefor.

In Column 7, Line 49, in Claim 1, before "battery" delete "A" and insert -- a --, therefor.

In Column 7, Line 53, in Claim 1, delete "air:" and insert -- air; --, therefor.

In Column 10, Line 45, in Claim 38, after "member" delete "is".

Signed and Sealed this

Twenty-third Day of November, 2010

David J. Kappos
*Director of the United States Patent and Trademark Office*